US011070596B1

(12) United States Patent
Yau et al.

(10) Patent No.: US 11,070,596 B1
(45) Date of Patent: Jul. 20, 2021

(54) VOLTE CIRCUIT SWITCH VOICE AND SMS INTERWORKING

(71) Applicant: Syniverse Technologies, LLC, Tampa, FL (US)

(72) Inventors: Edward Yau, Tseung Kwan O (HK); Brian Beach, Tampa, FL (US); Huiyue Xu, Tampa, FL (US); Prashant Datar, Tampa, FL (US)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 17/154,667

(22) Filed: Jan. 21, 2021

Related U.S. Application Data

(60) Provisional application No. 62/963,595, filed on Jan. 21, 2020.

(51) Int. Cl.
| | |
|---|---|
| *H04L 29/06* | (2006.01) |
| *H04W 36/00* | (2009.01) |
| *H04W 4/14* | (2009.01) |
| *H04W 8/12* | (2009.01) |

(52) U.S. Cl.
CPC .......... *H04L 65/1016* (2013.01); *H04W 4/14* (2013.01); *H04W 8/12* (2013.01); *H04W 36/0022* (2013.01)

(58) Field of Classification Search
CPC ............... H04L 65/1016; H04W 36/0022; H04W 4/14; H04W 8/12
USPC ............... 455/432.1–433, 436–445; 370/331
See application file for complete search history.

(56) References Cited

U.S. PATENT DOCUMENTS

| 9,749,904 B1* | 8/2017 | Zhang ................... H04W 8/04 |
| 9,794,769 B2 | 10/2017 | Dubesset et al. | |
| 2014/0169286 A1* | 6/2014 | Xu ....................... H04W 8/082 |
| | | | 370/329 |

* cited by examiner

*Primary Examiner* — Michael Y Mapa
(74) *Attorney, Agent, or Firm* — Andriy Lytvyn; Smith & Hopen, P.A.

(57) ABSTRACT

This invention is a system and method for implementing a VoLTE and circuit switched voice and SMS interworking function to provide voice and SMS service to roaming mobile devices at visiting network based on VoLTE roaming and 'SMS over SGs' towards VPLMN, and circuit-switched voice and SMS towards HPLMN. The interworking function enables and redirects IMS traffic at VPLMN towards a hosted IMS core with voice connectivity to PSTN via MGCF and MGW. The interworking function also performs circuit-switched location-update registration at HLR at HPLMN for receiving mobile-terminated voice calls and SMS.

19 Claims, 9 Drawing Sheets

VOLTE CIRCUIT SWITCH VOICE AND SMS INTERWORKING

PRIORITY CLAIM

This non-provisional patent application claim priority to the U.S. Provisional Application No. 62/963,595 filed Jan. 21, 2020.

BACKGROUND OF THE INVENTION

1. Field of the Invention

This invention relates generally to the field of Internet Protocol (IP) and telecommunications networks, specifically to interworking of voice over long-term evolution (VoLTE) and circuit-switched (CS) voice and short message service (SMS) in a roaming environment.

2. Brief Description of the Related Art

Circuit switch (CS) voice is a common technology that provides voice and SMS service to mobile network in a roaming environment. All 2G and 3G networks are using CS to provide voice and SMS service. To use CS for roaming, both visiting and home operators would need to equip with the CS network components (such as MSC, HLR) to provide both mobile-originated (MT) and mobile-terminated (MT) voice calls and SMS.

In 4G environment, a new technology known as 'VoLTE' is invented to provide voice service in a long-term evolution (LTE, "4G") network based on IP Multimedia Subsystem (IMS) technology and infrastructure. In addition, 'SMS over SGs' is a technology that provides SMS service in a 4G network, leveraging the SGs interface between a Mobility Management Entity (MME) and a Mobile Switching Center (MSC).

With VoLTE and 'SMS over SGs', visiting network operators no longer needs the CS infrastructure to provide voice and SMS service to inbound roamers. Many network operators are planning to shutdown their 2G/3G network infrastructure to save the frequency bands for 4G and 5G services, as well as to reduce the operation and maintenance costs.

However, the prerequisite for using VoLTE roaming is that the visiting operator needs to have VoLTE roaming agreement with the home operator. Unfortunately, this is not very common. Many home operators either do not have the IMS infrastructure, or they do not want to provide VoLTE roaming to subscribers to protect their voice and SMS roaming revenue. This creates a problem for visiting operators wishing to implement VoLTE roaming. Thus, these mobile providers cannot shutdown their 3G network infrastructure. A similar problem arises with LTE-only operators who do not have 2G/3G infrastructure, preventing them from providing voice and SMS service to inbound roamers.

In the current state of the art, there is a need for a method and a system for provide an interworking function (IWF) between VoLTE and circuit-switched voice and SMS service.

SUMMARY OF THE INVENTION

The present invention pertains to an Interworking Function (IWF) for enabling inbound roamers to use VoLTE for voice and 'SMS over SGs' for SMS service in a Visited Public Land Mobile Network (VPLMN) without the need for VoLTE roaming agreements with a Home Public Land Mobile Network (HPLMN) operators. The IWF behaves as VoLTE roaming toward the VPLMN and behaves as Circuit Switched (CS) roaming toward the HPLMN.

In an embodiment, the IWF includes the following functions: (1) Diameter Routing Agent (DRA) mediating S6a/s6d messages to redirect IP Multimedia Subsystem (IMS) traffic to a hosted IMS Core; (2) an IMS Core providing VoLTE roaming services towards a VPLMN and break-out mobile operator voice-to-public switched telephone network (PSTN) connection; (3) a virtual Home Subscriber Server (HSS) communicatively coupled to the DRA, the HSS supporting IMS registration; 4) a Packet Data Network Gateway (PGW) configured to break-out the IMS GPRS Tunneling Protocol (GTP) data into the IMS core. A Policy and Charging Rules Function (PCRF) is an optional function to provision static or dynamic rules to the PGW for Quality of Service (QoS) policy and charging control, such as bandwidth restriction (throttling) and online charging for VoLTE/IMS service.

In an embodiment, the IMS Core of the IWF comprises the following functions: (1) Proxy/Serving/Interrogating Call Session Control Function (P/S/I-CSCF), (2) Media Gateway Control Function (MGCF), (3) Media Gateway (MGW), and (4) Application Function (AF).

In an embodiment, the DRA in the IWF intercepts the diameter Update-Location-Request (ULR) and Update-Location-Answer (ULA) messages between VPLMN Mobility Management Entity (MME) and HPLMN Home Subscriber Server (HSS). The DRA is configured to add an 'ims' APN in the 'APN-Configuration-Profile' of the ULA message, if not provided in ULA message by HPLMN. The DRA is further configured to mediate the intercepted ULA message to enable the VPLMN to redirect the IMS traffic to the IMS Core of the IWF. Redirecting IMS traffic to the IMS Core can be achieved using one of multiple options. For example, one option involves using the 'APN-OI-Replacement' attribute to cause the Serving Gateway (SGW) of the VPLMN to replace HPLMN Access Point Name Operator-Identifier (APN-OI) with the domain of the IWF. Another option involves the DRA mediating the ULA message to set a VPLMN Address Allowed (VPAA) flag to enable the SGW to query a local Domain Name Server (DNS) configured to resolve the IMS APN into the IP address of the PGW of the IWF.

Upon IMS registration from the UE, I-CSCF of the IWF interrogates the virtual HSS via 'User-Authorization-Request (UAR) in Cx interface. The virtual HSS returns user-Authorization-Answer (UAA) with a preconfigured profile. The S-CSCF skips the 'Multimedia-Authentication Request/Answer' procedure. This is known as 'Early IMS Authentication'.

Mobile-Originated (MO) voice call from mobile device is realized by an IMS call using the Session Initiation Protocol (SIP) toward the hosted IMS Core of the IWF. The hosted IMS Core breaks out voice call to the PSTN via its MGCF and MGW.

Mobile-terminated (MT) voice toward the UE can be provided in the following manner: (1) VPLMN MME is configured to map all Tracking Area (TA) and Location Area (LA) data to a virtual Mobile Switching Center/Visitor Location Register (vMSC/VLR) of the IWF; (2) wherein the vMSC/VLR simulates Circuit Switched Fallback (CSFB) and performs CS registration at the Home Location Register (HLR); (3) MT-call reaches HPLMN Gateway MSC (GMSC), which obtains vMSC address by a Send-Routing-Information (SRI) query to HLR; (4) the GSMC triggers ISUP call to the vMSC/VLR of the IWF; and (5) the vMSC/VLR bridges voice bearer through an IMS MGW with the vMSC/VLR.

Mobile-Originated (MO) SMS is realized by 'SMS over SGs' technology, wherein the UE sends an SMS to the MME of the VPLMN over Non-Access Stratum (NAS) transport; (2) the MME sends the SMS to the vMSC/VLR over SGs interface; and (3) the vMSC/VLR sends MAP_MO_ForwardSM to SMS Center (SMSC) of the HPLMN.

Mobile-Terminated (MT) SMS is realized by 'SMS over SGs' technology, wherein (1) the SMSC of the HPLMN queries the vMSC/VLR Location from HLR using Send-Routing-Information-for-Short-Message (SRI_SM); 2) the SMSC of the HPLMN sends MAP_MT_ForwardSM to the vMSC/VLR of the IWF; and (3) the vMSC/VLR pings UE via MME (SGs interface) of the VPLMN; and (4) the MME sends the SMS to the UE over NAS Transport.

BRIEF DESCRIPTION OF THE DRAWINGS

For a fuller understanding of the invention, reference should be made to the following detailed disclosure, taken in connection with the accompanying drawings, in which.

DETAILED DESCRIPTION

In the following detailed description of the preferred embodiment, reference is made to the accompanying drawings, which form a part hereof, and within which specific embodiments are shown by way of illustration by which the invention may be practiced. It is to be understood that other embodiments may be utilized and changes may be made without departing from the scope of the invention.

Figure 1:
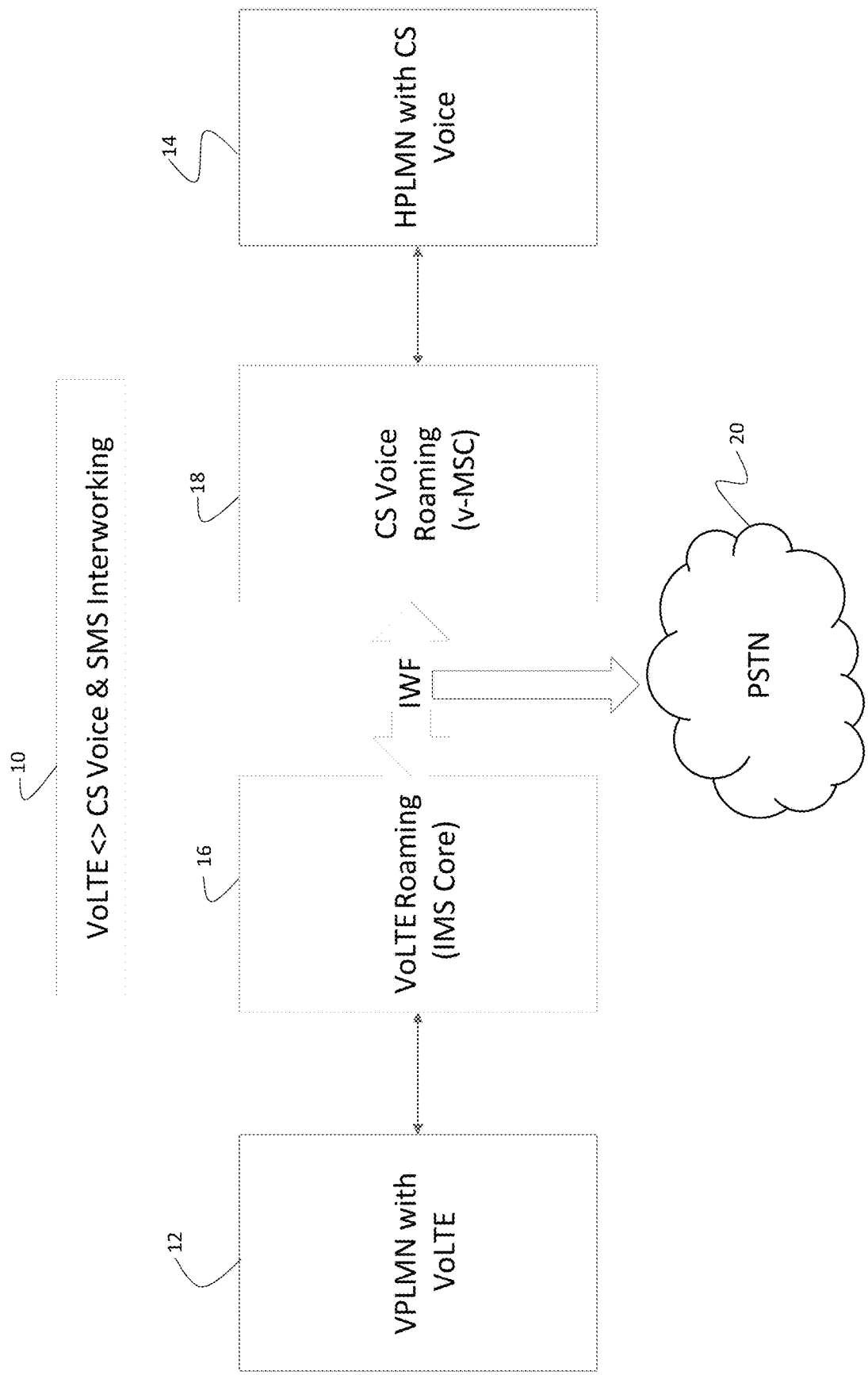
FIG. 1 is a block diagram schematically depicting the conceptual architecture of the VoLTE and CS voice & SMS Interworking Function (IWF). The IWF acts as a VoLTE roaming towards VPLMN and CS voice/SMS roaming towards HPLMN.

FIG. 1 provides a schematic depiction of an embodiment of the invention. An Interworking Function (IWF) 10 is deployed between a Visited Public Land Mobile Network (VPLMN) 12 and a Home Public Land Mobile Network (HPLMN) 14.

VPLMN 12 is a Packet-Switched (PS) network—e.g., 5G, 4G, Long-Term Evolution (LTE) network. In the current state of the art, there are two models according to which PS VPLMN 12 can provide inbound roaming services to a subscriber of HPLMN 14. The first model is CS Fallback (CSFB). A major limitation of CSFB model is that it requires VPLMN 12 to have CS network components. The second model is Voice Over Long-Term Evolution (VoLTE) roaming. A major limitation of VoLTE roaming is that VPLMN 12 and HPLMN 14 must have a preexisting agreement with one another, making it impractical for many network providers.

In an embodiment, the present invention addresses this problem by providing IWF 10 in communication with both VPLMN 12 and HPLMN 14. IFW 10 enables VPLMN 12 to provide voice and SMS roaming services to a subscriber of HPLMN 14 without requiring VPLMN 12 to have CSFB capability or a VoLTE roaming agreement with HPLMN 14.

As depicted in FIG. 1, IWF 10 has an IMS Core 16 which behaves like VoLTE (S8HR) roaming toward VPLMN 12. IFW 10 also has a virtual Mobile Switching Center/Visitor Location Register (vMSC/VLR) 18, which behaves like a CS network or CSFB toward HPLMN 14. IMS Core 16 and vMSC/VLR 18 are configured to communicate with one another, thus enabling VPLMN 12 to provide voice services to a roamer subscribed to HPLMN 14 without using CSFB. IWF 10 is configured to break-out mobile-originated phone calls to Public Switched Telephone Network (PSTN) 20. Furthermore, vMSC/VLR 18 of IWF 10 enables VPLMN 12 to use SMS-over-SGs technology to provide SMS services to the inbound roaming subscribers of HPLMN 14.

Figure 2:
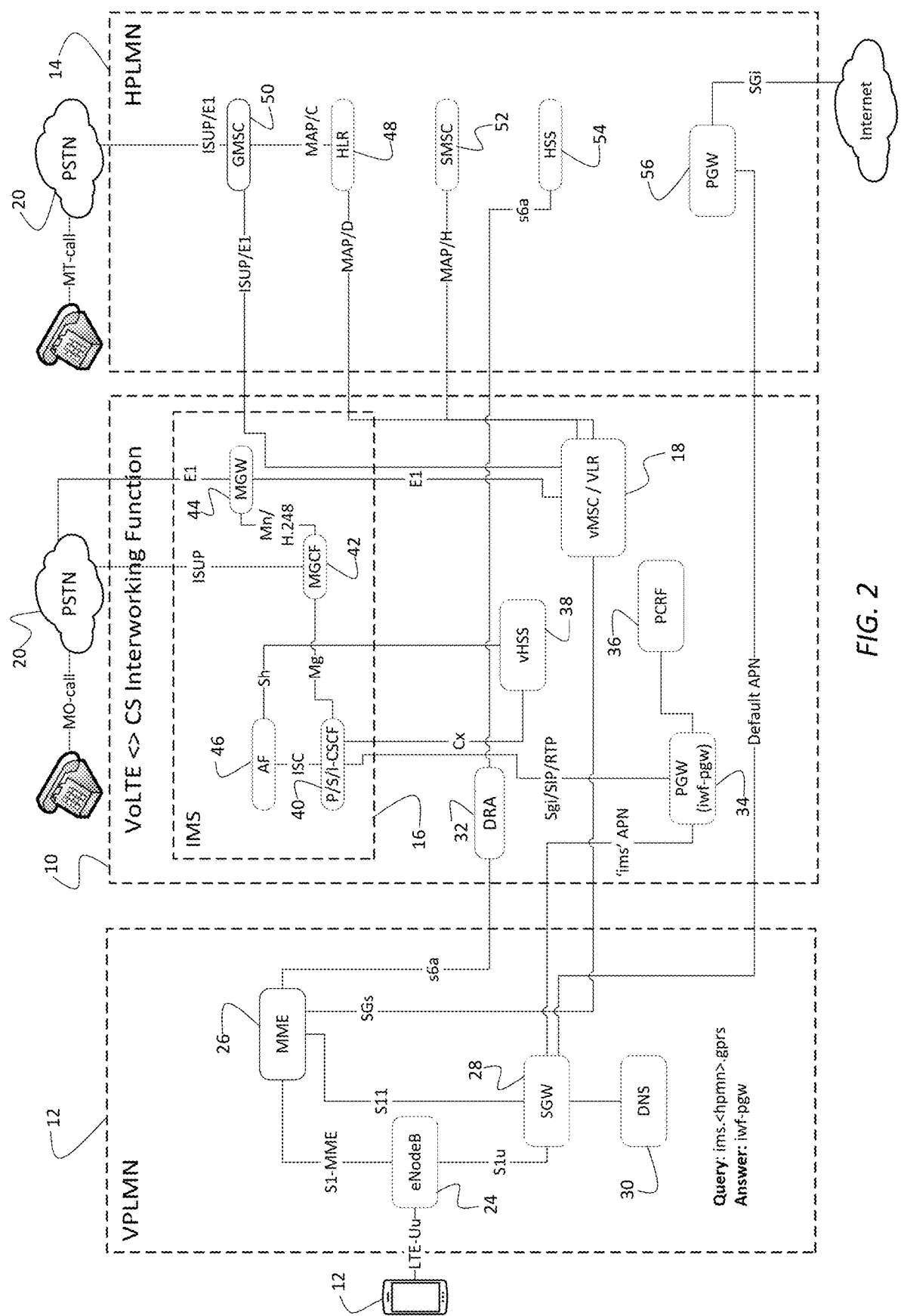
FIG. 2 is a block diagram schematically depicting the system architecture of the IWF.

FIG. 2 depicts a roaming User Equipment (UE) 22 establishing a connection to eNodeB 24 of VPLMN 12. UE 22 is a subscriber of HPLMN 14. As explained above VPLMN 12 is a PS network without CSFB. FIG. 2 further depicts that VPLMN 12 comprises the following components: a Mobility Management Entity (MME) 26, Serving Gateway (SGW) 28, and Domain Name Server (DNS) 30.

Next, FIG. 2 depicts IWF 10 comprising IMS Core 16, vMSC/VLR 18, a Diameter Routing Agent (DRA) 32, a Packet Data Network Gateway (PGW) 34, Policy and Charging Rules Function (PCRF) 36, and virtual Home Subscriber Server (vHSS) 38. FIG. 2 further depicts that IMS Core 16 comprises a Proxy/Serving/Interrogating Call Session Control Function (P/S/I-CSCF) 40, Media Gateway Control Function (MGCF) 42, Media Gateway (MGW) 44, and Application Function (AF) 46.

FIG. 2 further depicts that HPLMN 14 comprises a Home Location Register (HLR) 48, a Gateway MSC (GMSC) 50, a Short Message Service Center (SMSC) 52, a Home Subscriber Server (HSS) 54, and PGW 56.

FIG. 2 depicts that IWF 10 communicates with both VPLMN 12 and HPLMN 14. DRA 32 of IWF 10 is communicatively connected to MME 26 of VPLMN 12 and HSS 54 of HPLMN 14 over s6a interface. DRA 32 is configured to intercept Update-Location-Request (ULR) and/or Update-Location-Answer (ULA) messages exchanged between MME 26 and HSS 54. DRA 32 can be configured configured to mediate the intercepted ULA messages. The DRA 32 mediates the ULA message in a manner that enables VPLMN 12 to direct IMS traffic to IWF 10, rather than HPLMN 14.

A first example of mediating the ULA message includes DRA 32 inserting an APN-OI-Replacement flag requesting SGW 28 to replace home APN-OI with the domain of IWF 10 for IMS APN-Configuration. A second example of mediating the intercepted ULA message includes the step of DRA 32 inserting a VPLMN Address Allowed (VPAA) flag into the ULA message. The VPAA flag is used to request SGW 28 to query local VPLMN DNS 30 rather than a DNS of HPLMN 14, wherein VPLMN DNS 30 is specifically configured to return IP address of IWF PGW 34, even when the Operator Identifier in the APN string used in the DNS query contains the domain of HPLMN 14. In either case, the mediated ULA message enables SGW 28 to perform a query configured to return the IP Address of PGW 34, thus enabling SGW 28 to establish a General Packet Radio Service Tunneling Protocol (GTP) session in which SGW 28 of the VPLMN 12 is communicatively coupled with PGW 34 of the IWF 10.

FIG. 2 further depicts that PGW 34 enables a connection between VPLMN 12 and IMS Core 16 of IWF 10. In this manner, UE 22 is able to make a mobile-originated (MO) voice call with SIP/RTP via SGW 28, IWF-PGW 34, and hosted IMS Core 16. Hosted-IMS Core 16 breaks-out the MO voice-call to PSTN 20 via MGCF 42 and MGW 44. P/I/S-CSCF 40 generates a Call Detail Record (CDR) for billing purposes.

Next, FIG. 2 depicts that vMSC/VLR 18 of IWF 10 communicates with HLR 48 of HPLMN 14 using Mobile Application Part (MAP) protocol. IWF 10 uses vMSC/VLR 18 to establish a Circuit Switched (CS) connection with HPLMN 14. This is accomplished by vMSC/VLR 18 triggering a MAP-Location-Update procedure with HLR 48 to update the Global Title (GT) address of vMSC/VLR 18 in HLR 48 so that in subsequent Mobile-Terminated (MT) voice calls and SMS messages, HLR 48 will return GT of vMSC/VLR 18 for UE 22.

FIG. 2 also depicts that vMSC/VLR 18 bridges MGW 44 within IMS Core 16 with GSMC 50 of HPLMN 14, thereby enabling MT-voice roaming service for the UE 22.

Finally, FIG. 2 depicts that SMSC 52 of HPLMN 14 and MME 26 of VPLMN 12 are connected via vMSC/VLR 18 of IWF 10. This connection enables VPLMN 12 to use 'SMS over SGs' technology to provide MO and MT SMS roaming service to UE 22.

Network Attachment

Figure 3:
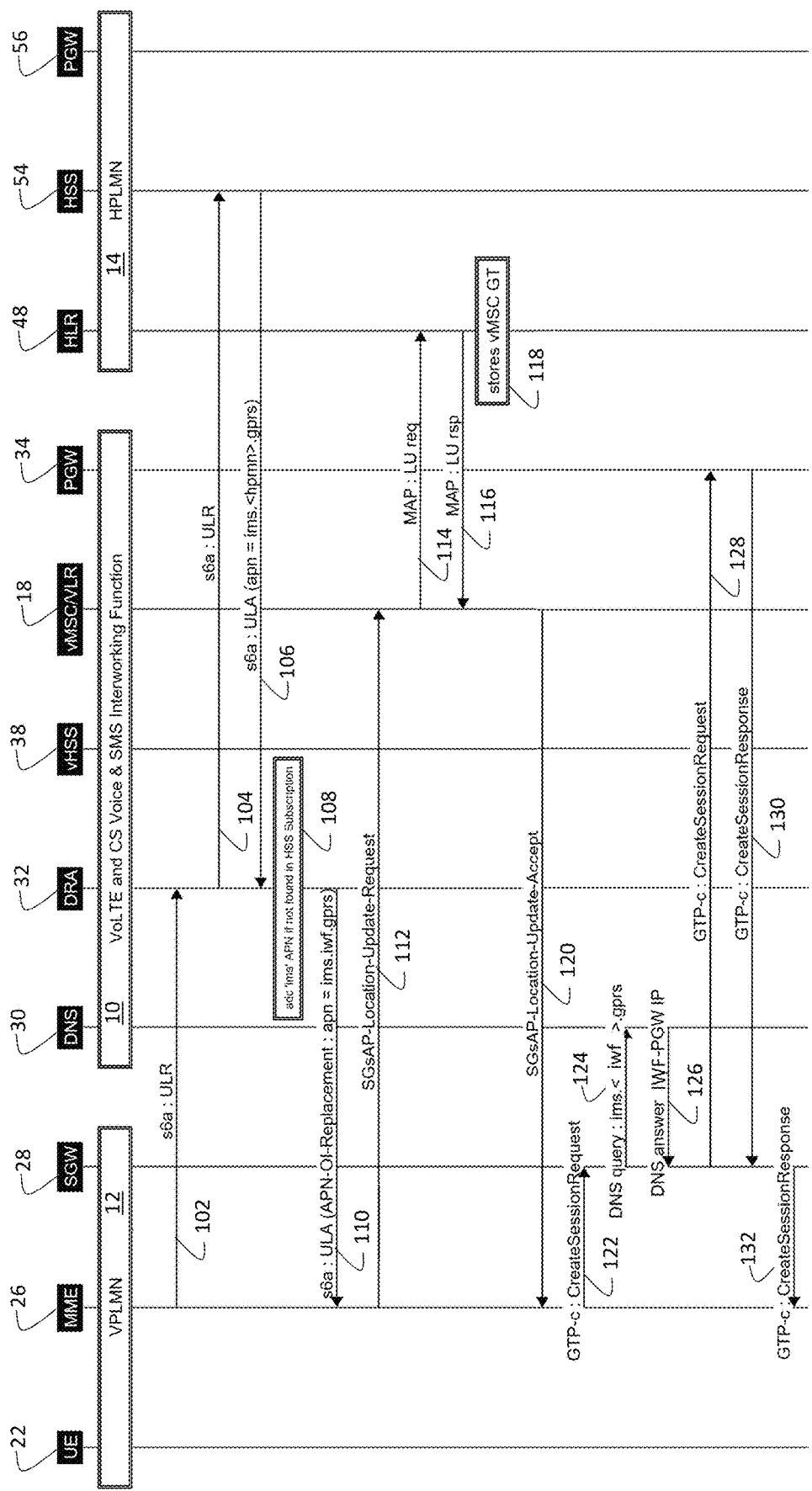
FIG. 3 is a signaling diagram schematically depicting the callflow for network attachment, wherein IMS traffic redirection toward IWF is achieved using APN-OI-Replacement scheme.
Figure 4:
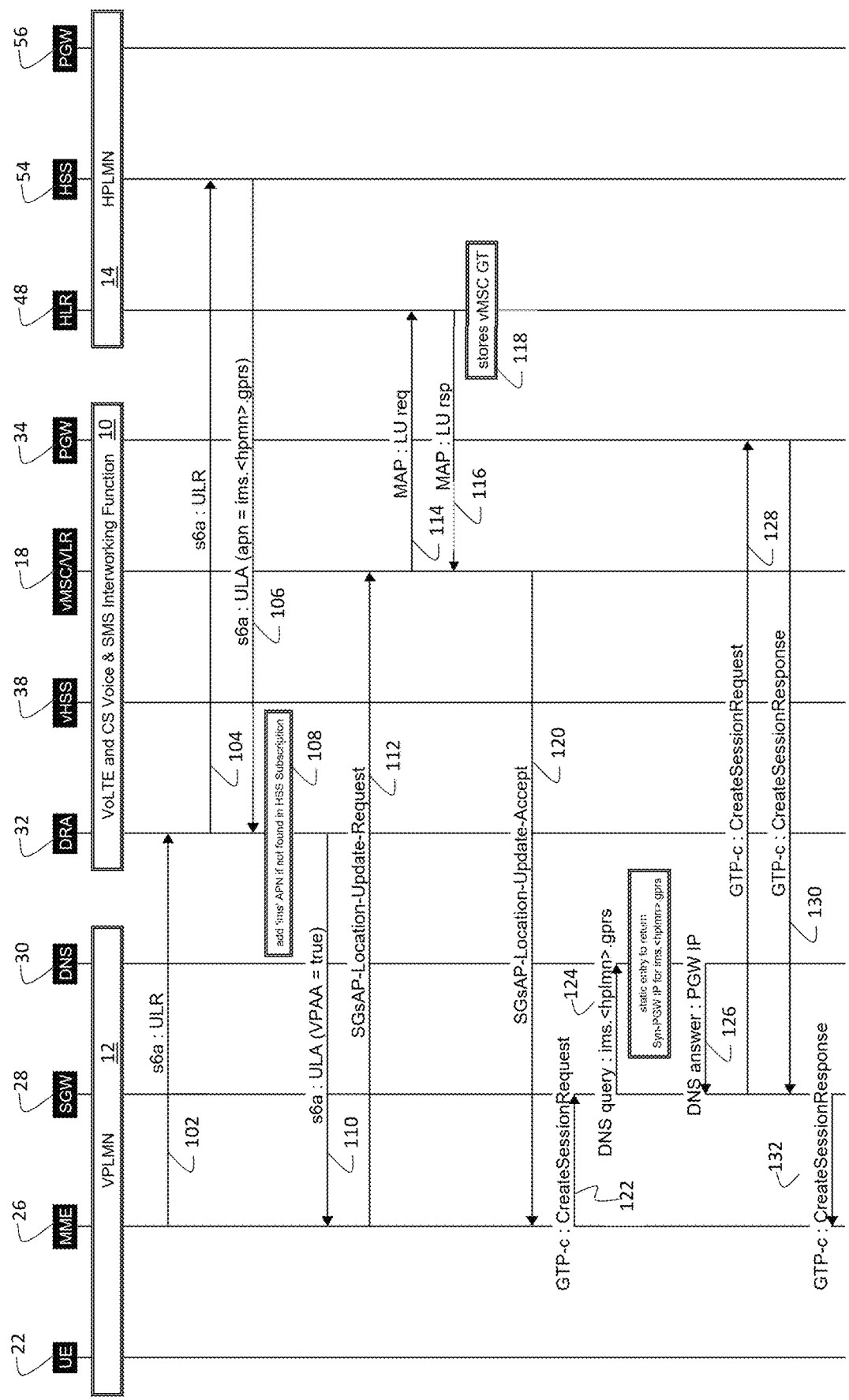
FIG. 4 is a signaling diagram schematically depicting the callflow for network attachment, wherein IMS traffic redirection toward IWF is achieved using VPAA flag.

FIGS. 3 and 4 depict signaling flows for network attachment using IWF 10. FIG. 3 depicts the embodiment in which DRA 32 uses API-OI-Replacement attribute of Update-Location-Answer (ULA) to cause VPLMN 12 to redirect IMS traffic toward IWF 10. In this embodiment, in steps 102-104, MME 26 of VPLMN 26 sends a Diameter Update-Location-Request (ULR) to HSS 54 via DRA 32. In step 106, HSS 54 responds to ULR with and an Update-Location-Answer (ULA) message. DRA 32 intercepts the ULA message. If the ULA message does not contain an 'ims' APN to the 'APN-Configuration-Profile' in 'HSS-Subscription-Data', DRA 32 adds the 'ims' APN in step 108. This step enables UE 22 to establish a GTP session for the 'ims' APN towards SGW 28 and PGW 34.

The intercepted ULA message is configured to cause VPLMN 12 to direct IMS traffic to HPLMN's PGW 56 for data access. To redirect IMS traffic to PGW 34 of IWF 10, DRA 32 utilizes 'APN-OI-Replacement' attribute in the ULA message. The full APN comprises two parts: (1) Network Identifier (e.g. ims) and (2) Operator Identifier (e.g. mnc001.mcc002.gprs). API-OI-Replacement is an attribute that DRA 32 inserts into the ULA message to request SGW 28 to replace the domain of HPLMN 14 in 'Operation Identifier' portion of the APN with the domain of IWF 10. For example, a full APN 'ims.mnc001.mcc002.gprs' would be replaced with APN 'ims.iwf.gprs'.

In step 110, DRA 32 send the mediated ULA message to MME 26. Subsequently, in steps 124, the APN-OI-Replacement flag inserted by DRA 32 causes SGW 28 to perform a DNS query using the domain of IWF 10. In step 126, this DNS query resolves to the IP address of PGW 34 of IWF 10.

After ULR/ULA procedure is completed, MME 26 performs a 'Combined EPS/IMSI attachment procedure' and, in step 112, sends a 'Location-Update-Request' to vMSC/VLR 18 via SGs interface. This is realized by a static configuration in MME 26 to map all Tracking-Area/Location-Area to the address of vMSC/VLR 18.

Next, in step 114, vMSC/VLR 18 triggers a MAP-Location-Update procedure with HLR 48 of HPLMN 14. In step 116, HLR 48 sends a response back to vMSC/VLR 18. In step 118, HLR 48 updates a Global Title (GT) address of vMSC/VLR 18. Accordingly, in subsequent MT voice and SMS calls, HLR 48 will return the GT address of vMSC/VLR 18 associated with UE 22. In step 120, vMSC/VLR 18 sends a Location Update Accept message to MME 26.

Next, in step 122, MME 26 sends a GTP Create Session Request to SGW 28. In step 124, SGW 28 queries a DNS using the APN of IWF10, as directed by APN-OI-Replacement flag in the mediated ULA message (from step 110). In step 126, the DNS query return the IP address of PGW 34 of IWF 10. In step 128, SGW 28 sends the GTP Create Session Request to the IP address of PGW 34. In step 130, PGW 34 responds to SGW 28 and, in step 132, SGW 28 sends the GTP Create Session Response to MME 26.

FIG. 4 depicts an alternative method according to which DRA 32 can mediate the intercepted ULA message to redirect IMS traffic to IWF 10. In this embodiment in step 110, DRA 12 utilizes a VPAA flag in the mediated ULA message that DRA 32 sends to MME 26 to redirect traffic to PGW 34 of IWF 10. The VPAA flag is used to request SGW 32 to query local (VPLMN) DNS 30 instead of a DNS server of HPLMN 14. Local DNS 30 is specifically configured to return the IP address of PGW 34 of IWF 10. Accordingly, when in step 124, SGW 32 queries DNS 30 with the full APN string (which contains HPLMN domain in Operator Identifier), DNS 30 returns the IP address of PGW 34 of IWF 10. The remaining steps in both embodiments depicted in FIGS. 3 and 4 are substantially the same.

IMS Registration

Figure 5:
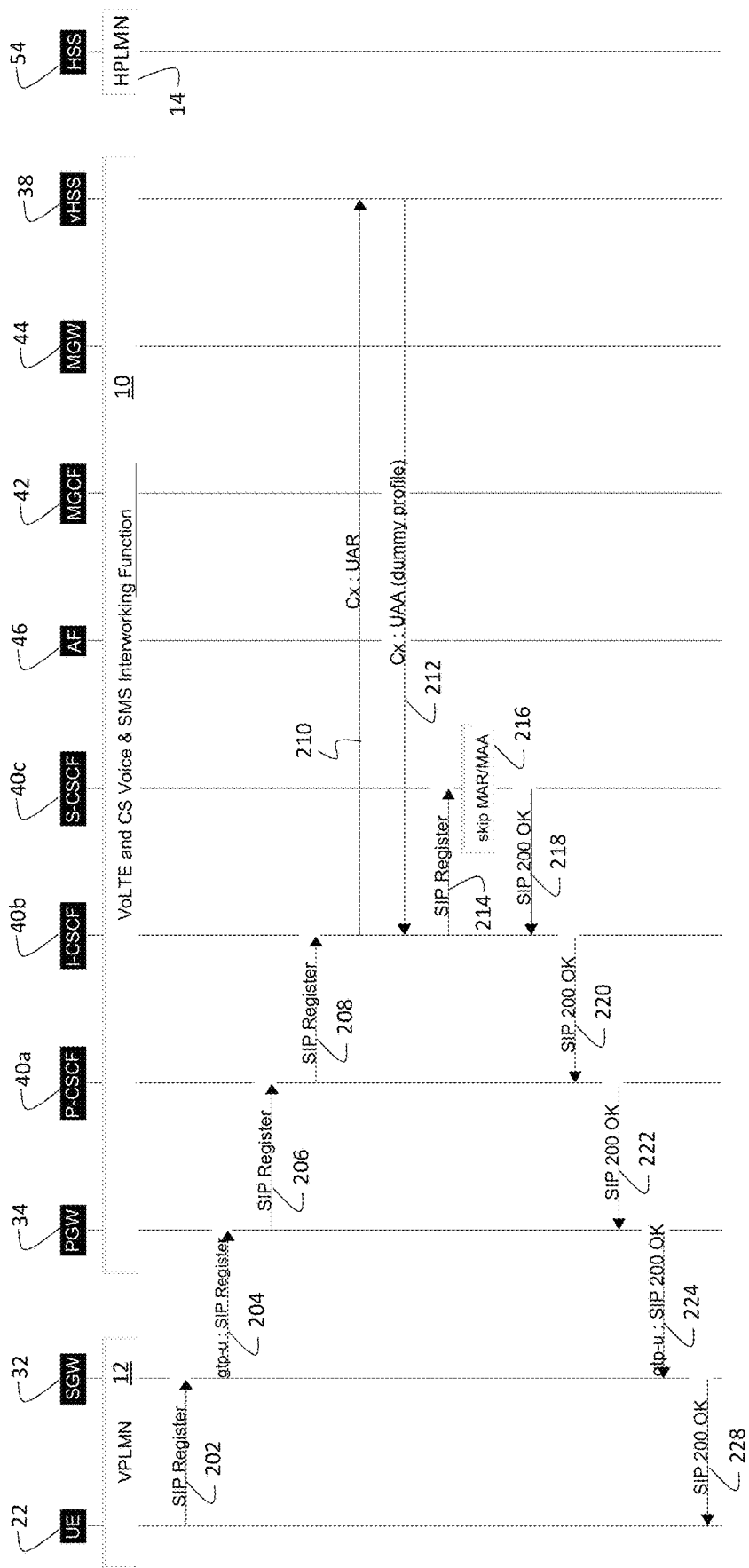
FIG. 5 is a signaling diagram schematically depicting the callflow for IMS Registration using the IWF.

In the embodiment depicted in FIG. 5, IMS registration is initiated in step 202, in which UE 22 sends a Session Initiation Protocol (SIP) 'REGISTER' request towards IMS Core 16 via SGW 32. In step 204, SGW 32 send the SIP Register request to PGW 34. In step 206, PGW 34 send the SIP Register request to P-CSCF 40*a*, which, in step 208 sends this SIP Register request to I-CSCF 40*b*.

In step 210, I-CSCF 40*b* interrogates vHSS 38 of the IWF 10 with 'User-Authorization-Request' over Cx interface. In step 212, vHSS 38 returns a preconfigured dummy profile in a 'User-Authentication-Answer' response. Notably, neither VPLMN 12 nor IWF 10 needs to perform the normal IMS authentication with HSS 54 of HPLMN 14. Indeed, the present invention does not depend on IMS profile at HSS 54 of HPLMN 14.

Next, in step 214, I-CSCF 40*b* sends the SIP Register request to S-CSCF 40*c*. In step 216, the S-CSCF skips the Cx 'Multimedia-Authentication' (MAR/MAA) procedure and, in step 218, I-CSCF 40*b* directly returns an '200 OK' towards the SIP REGISTER request. This is known as 'Early IMS Authentication'. With the 'Early IMS Authentication', security (authentication and authorization) is provided by checking the source IP of UE's SIP request, which shall match the end-user IP address which is allocated during the GTP session establishment (Create Session Request/Response), identified by Mobile Subscriber ISDN Number (MSISDN). In steps 220-228, the SIP 200 OK response is delivered to UE 22 via PGW 34 and SGW 32.

MO-Voice Service

Figure 6:
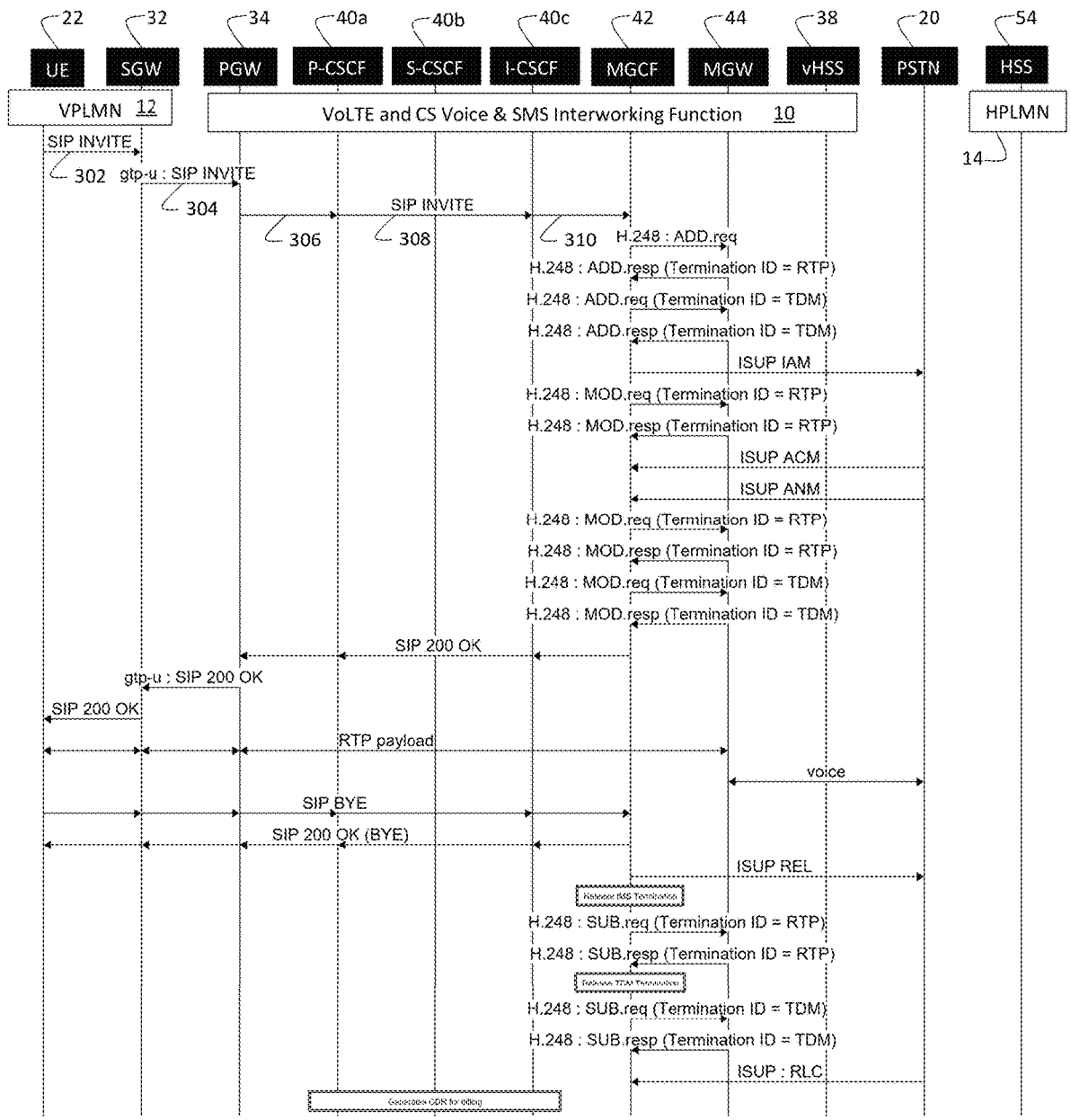
FIG. 6 is a signaling diagram schematically depicting the callflow for MO-voice service using the IWF.
Figure 7:
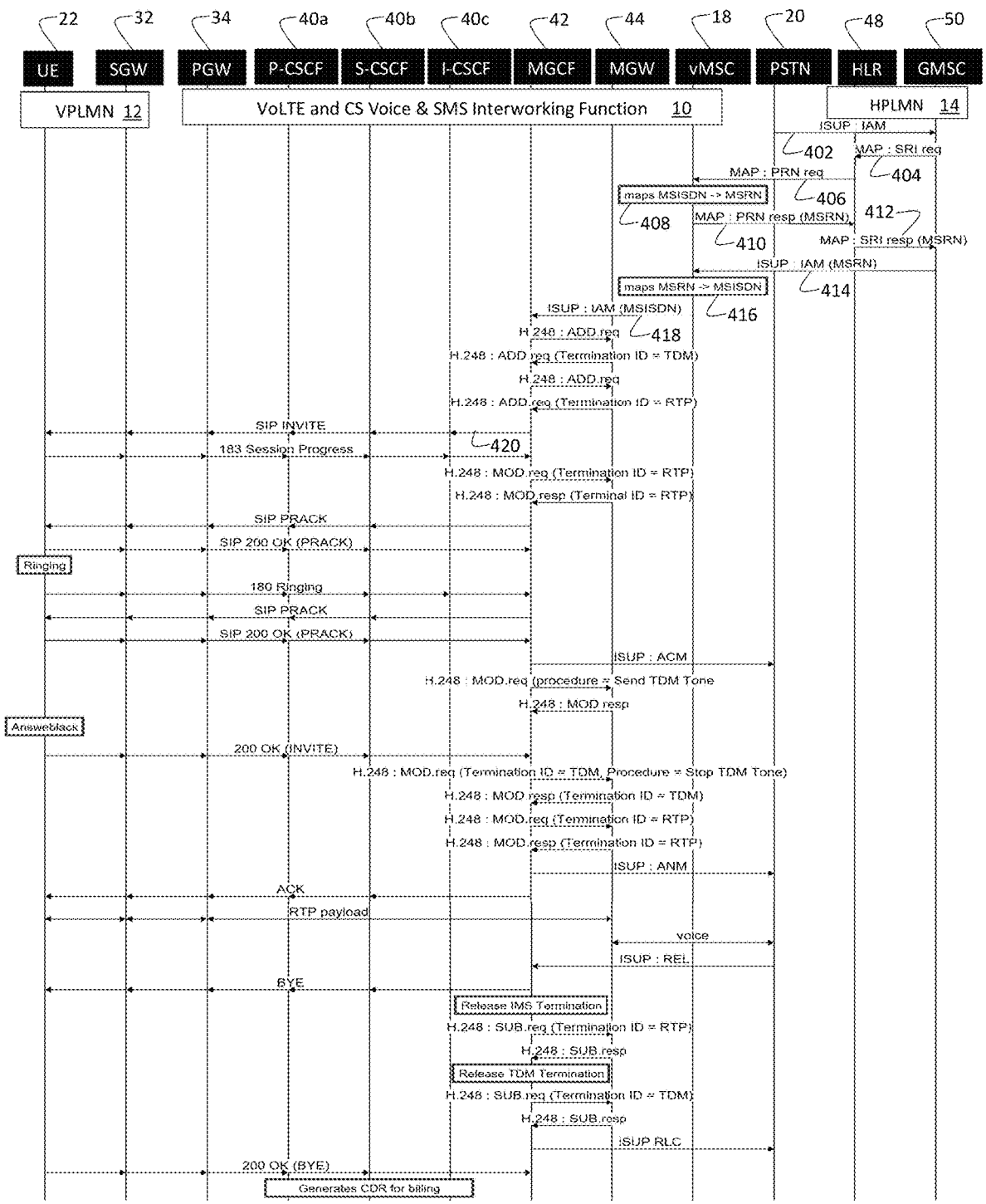
FIG. 7 is a signaling diagram schematically depicting the callflow for MT-voice service using the IWF.

FIG. 6 depicts a signaling diagram for a Mobile-Originated (MO) voice call from UE 22. In step 302, UE 22 sends a SIP Invite to SGW 32. In step 304, SGW 32 sends the SIP Invite to PGW 34. In step 306, PGW 34 sends the SIP Invite to IMS Core 16, specifically to P-CSCF 40a. In step 308, P-CSCF 40a sends the SIP Invite to S-CSCF 40c, and, in step 310, S-CSCF 40c sends the SIP Invite to MGCF 42. Next, FIG. 6 depicts the series of steps in which MGCF 42 and MGW 44 trigger an ISUP call to PSTN 20. In this manner, IMS Core 16 breaks-out a MO phone call to PSTN 20. Finally, P/I/S-CSCF 40 generates a CDR for billing purposes.

From VPLMN 12 perspective, this method is in accords with VoLTE procedure. However, as depicted in FIG. 6, HPLMN 14 is not involved in providing MO phone call service to UE 22 because the functionality that under a standard VoLTE procedure would have been handled by HPLMN 14 are handled by IWF 10.

MT-Voice Service

FIG. 6 depicts a signaling diagram for a Mobile-Terminated (MT) voice call toward UE 22. In step 402, MT-call reaches HPLMN Gateway MSC (GMSC) 50. In steps 404, GMSC 50 sends a Send-Routing-Information (SRI) query to HLR 48. In step 406, HLR 48 send a MAP/PRN request for routing number to vMSC 18 of IWF 10. In step 408, vMSC 18 maps Mobile Station International ISDN Number (MSISDN) associated with UE 22 to Mobile Station Roaming Number (MSRN). In step 410, vMSC 18 returns the MSRN to HLR 48. In step 412, HLR 48 responds to the SRI query from GMSC 50. In this manner GSMC obtains the address of vMSC 18.

Next, in step 414, GSMC 50 triggers ISUP call to vMSC 18 based on the MSRN. In step 416 vMSC 18 translates the MSRN back to MSISDN. In step 418, vMSC 18 connects ISUP call to MGCF 42 and MGW 44 and bridges voice bearer with MGW 44. In step 420, MGCF 42 triggers a SIP-INVITE towards UE 22 via I/S/P-CSCF 40. I/S/P-CSCF 40 initiates MT voice call to UE 22 via the SIP Invite and bridges the call with the RTP payload. Finally, P/I/S-CSCF 40 generates a CDR for billing purposes.

The location of UE 22, specifically the Global Title (GT) of the vMSC/VLR 18 serving UE 22, is stored in HLR 48 of HPLMN 14 during the network attachment procedure (depicted in FIG. 3) when MME 26 performs a 'Combined EPS/IMSI attachment' procedure towards the vMSC/VLR 18 via the SGs interface, which triggers a MAP-Location-Update procedure to register its address in HLR 48.

MO SMS

Figure 8:
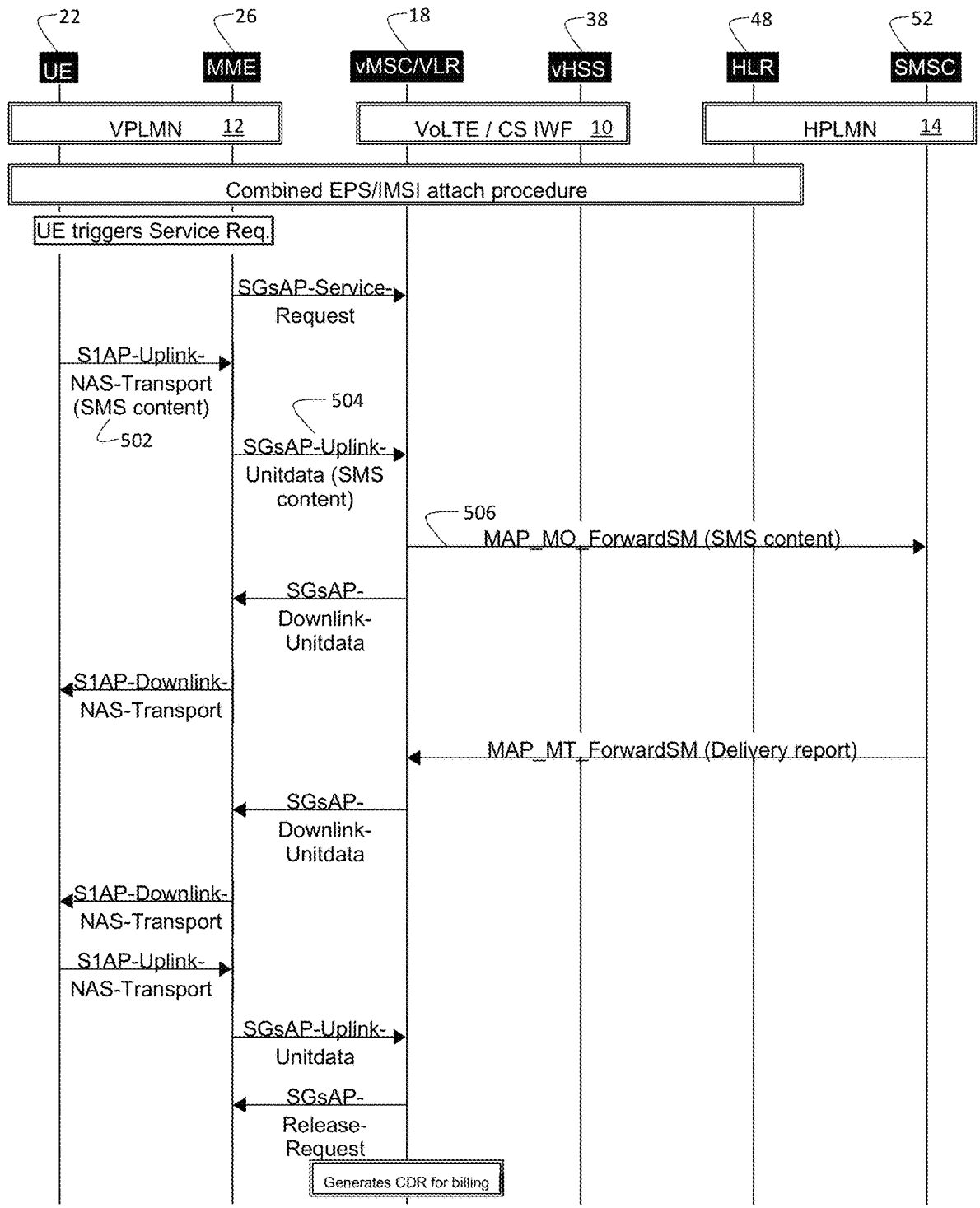
FIG. 8 is a signaling diagram schematically depicting the callflow for MO-SMS service using the IWF.
Figure 9:
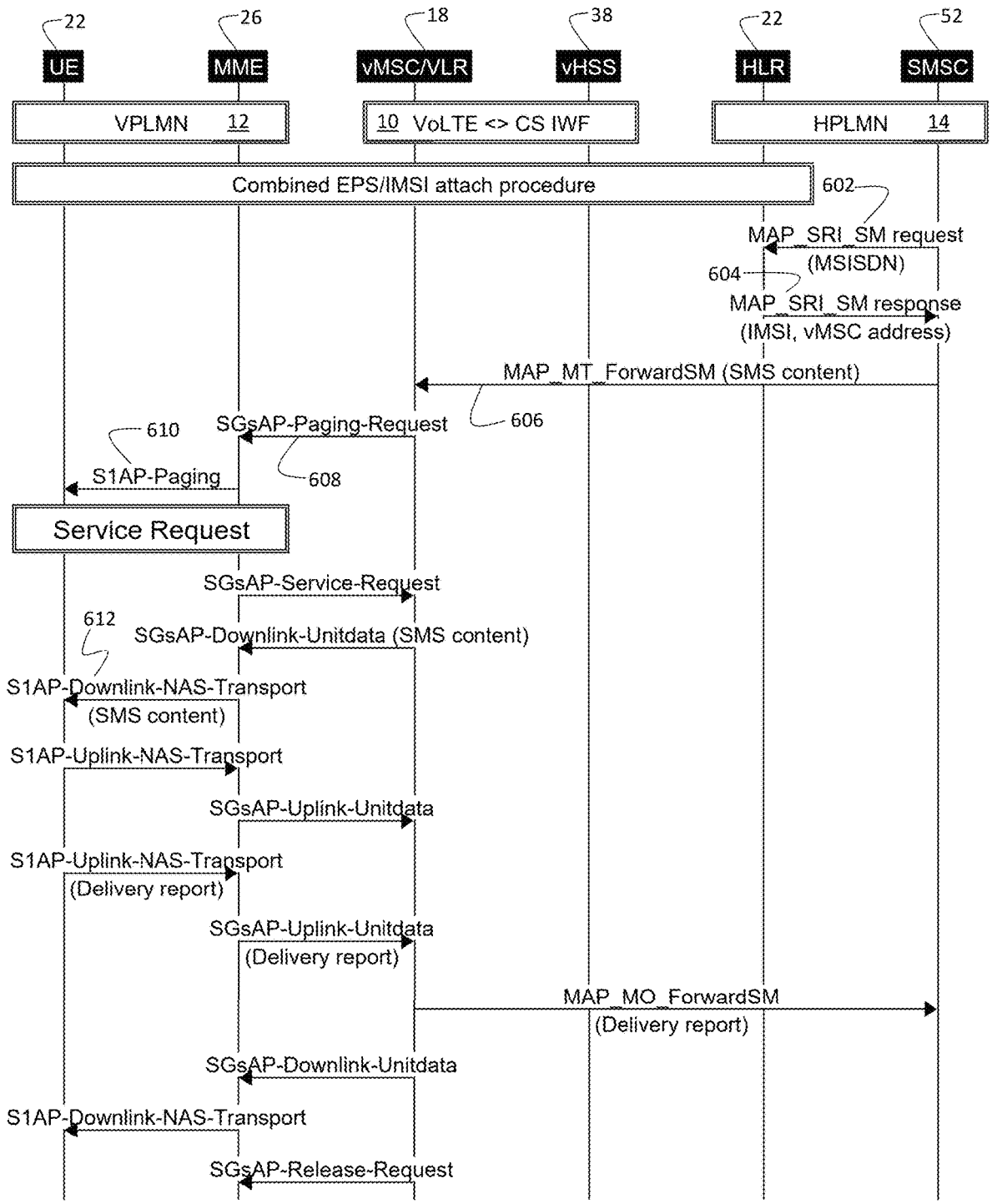
FIG. 9 is a signaling diagram schematically depicting the callflow for MT-SMS service using the IWF.

FIG. 8 depicts how Mobile-Originated (MO) SMS can be realized using 'SMS over SGs' technology. In step 502, UE 22 sends an SMS message to MME 26 over Non-Access Stratum (NAS) transport. In step 504, MME 26 sends SMS to vMSC/VLR 18 over SGs interface. In step 506, vMSC/VLR 18 sends MAP_MO_ForwardSM to SMS Center (SMSC) 52 of HPLMN 14. Delivery Report is supported in the same manner via an opposite path to the one described above. Finally, vMSC/VLR 18 generates a CDR for billing.

MT SMS

FIG. 8 depicts how Mobile-Terminated (MT) SMS can be realized using 'SMS over SGs' technology. In step 602, SMSC 52 queries location of vMSC/VLR 18 from HLR 48 using Send-Routing-Information-for-Short-Message (SRI_SM). In step 604, HLR 48 responds with IMSI of UE 22 and address of vMSC/VLR 18. In step 606, SMSC 52 sends MAP_MT_ForwardSM to vMSC/VLR 18 of IWF 10. In steps 608-610, vMSC/VLR 18 pings UE 22 via MME 26 over SGs interface. In step 612, MME 26 sends SMS to UE 22 over NAS Transport. Delivery Report is supported in the same manner via an opposite path to the one described above.

Hardware and Software Infrastructure Examples

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device. Storage and services may be on premise or remote such as in the "cloud" through vendors operating under the brands, MICROSOFT AZURE, AMAZON WEB SERVICES, RACKSPACE, and KAMATERA.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Hardware equipment may be agnostic as to general computing or may be telecommunications-specific. Some equipment providers include those under the brands HUAWEI, CISCO SYSTEMS, NOKIA, and QUALCOMM.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present invention may be written in any combination of one or more programming languages, including an object-oriented programming language such as Java, C#, C++, Visual Basic or the like and conventional procedural programming languages, such as the "C" programming language or similar programming languages. Additional languages like ERLANG (or Open Telecom Platform, OTP) may be used or scripting languages such as PYTHON, LUA and PERL.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

Glossary of Terms

Access Point Name (APN) refers to a gateway between a GSM, GPRS, 3G or 4G mobile network and another computer network, frequently the public Internet. The APN identifies the packet data network (PDN) that a mobile data user wants to communicate with. In addition to identifying a PDN, an APN may also be used to define the type of service.

Application Function (AF) is a logical element of the 3GPP policy and charging control (PCC) framework which provides session related information to the policy and charging rules function (PCRF) in support of PCC rule generation.

Attribute Value Pair (AVP) means an information element of a Diameter Protocol message. Each Diameter message will contain multiple AVPs, such as Destination-Host AVP, Subscription ID AVP, Server-Name AVP, Framed IP Address AVP and the like.

Diameter is an authentication, authorization, and accounting protocol for computer networks.

Diameter Routing Agent (DRA) is an element in a 3G or 4G (such as LTE) network that enables real-time routing capabilities so that messages are routed among the correct elements in a network. The DRA was launched by the 3GPP to address the increased Diameter signaling traffic and growing sophistication of 4G LTE networks.

Evolved Node B (eNB or eNodeB) is a base station terminating the air interface on the network side. It is responsible for all radio resource management. It is also responsible for allocation of user traffic to the downlink/uplink, security and relaying of higher layer NAS (Non-Access Stratum) signaling to the MME.

Gateway Mobile Switching Center (GMSC) is a function within a PLMN (Public Land Mobile Network). GMSC terminates the PSTN (Public Switched Telephone Network) signaling and traffic formats. It converts this to protocols used in mobile networks. For mobile terminated calls, GMSC interacts with the HLR (Home Location Register) to retrieve routing information.

General Packet Radio Service (GPRS) is a packet oriented mobile data standard on the 2G and 3G cellular communication network's global system for mobile communications (GSM).

GPRS Tunneling Protocol (GTP) is defined by 3GPP standards to carry General Packet Radio Service (GPRS) within 3G/4G networks.

HLR means Home Location Register which is a database that contains subscription data about subscribers authorized to use the GSM core network. The HLRs store details of every SIM card issued by the mobile phone operator.

Home Public Land Mobile Network (HPLMN) means the network in which a mobile subscriber's profile is held. Mobile users that roam on other networks (visiting) receive subscription information from the HPLMN.

H.248 is the media gateway control protocol (MGCP) specified by the International Telecommunications Union-Telecommunication Standardization Sector.

HSS means Home Subscriber Service which implements HLR and Diameter signaling.

The HSS is a central database that contains user-related and subscription-related information. The functions of the HSS include functionalities such as mobility management, call and session establishment support, user authentication and access authorization. The HSS is used in IMS and 4G while HLR is used in 2G and 3G.

IMS means IP Multimedia Subsystem, an architectural framework to standardize the delivery of voice and other multimedia services of IP packet-switched networks.

IMSI means International Mobile Subscriber Identity. It is a specification used to uniquely identify a subscriber to a mobile telephone service. It is used internally to a GSM network and is adopted on nearly all cellular networks. The IMSI is a 50-bit field which identifies the phone's home country and carrier and is usually fifteen digits. This 15-digit number has two parts. The first part is comprised of six digits in the North American standard and five digits in the European standard. It identifies the GSM network operator in a specific country where the subscriber holds an account. The second part is allocated by the network operator to uniquely identify the subscriber. For GSM, UMTS and LTE network, this number is provisioned in the SIM card and for CDMA2000 in the phone directly or in the R-UIM card (the CDMA2000 analogue to a SIM card for GSM).

Long-Term Evolution (LTE) is a standard for wireless broadband communication for mobile devices and data terminals, based on the GSM/EDGE and UMTS/HSPA technologies.

Media Gateway (MGW) handles the media plane (voice) in a distributed switch.

Media Gateway Control Function (MGCF) facilitates call control, interfacing the PS domain to the circuit switched domain when interworking between the IMS and PSTN is necessary.

Mobile application part (MAP) is an SS7 protocol used to access the home location register (HLR), visitor location register (VLR), mobile switching center and other components of a mobile network infrastructure.

MSISDN means Mobile Station International Subscriber Directory Number which is provisioned to a mobile device subscriber for making calls. It is the mapping of the telephone number to the SIM card (or CDMA2000 directly in the hardware) in a mobile or cellular phone and is the number normally dialed to connect a call to the mobile device. A SIM card has a unique IMSI that does not change but the MSIDN can change in time (e.g., telephone number portability).

Policy and Charging Rules Function (PCRF) is the software node designated in real-time that supports service data flow detection, policy enforcement and flow-based charging.

S6a Interface is Diameter interface between MME and HSS in the LTE network providing messages and procedures for phone attachment.

Serving Gateway (SGW) routes and forwards user data packets. The SGW manages and stores UE contexts, e.g. parameters of the IP bearer service, network internal routing information.

Session Initiation Protocol (SIP) is a protocol designed to establish, maintain and terminate multimedia sessions. SIP has been adopted as the main signaling protocol in different network architectures. This SIP is deployed in 3GPP IMS (IP Multimedia System).

User Equipment (UE) means a mobile device connectable to a cellular telecommunications network.

Visitor Location Register (VLR) means a database storing data about mobile phones that recently joined a particular area of a mobile operator's network. The VLR keeps track of roamed mobile phone subscribers and communications with the HLR to determine whether the mobile phone is a permanent or temporary subscriber.

Visited Public Land Mobile Network (VPLMN) means a network that a mobile subscriber roams on when leaving their Home Public Land Mobile Network (HPLMN).

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

What is claimed is:

1. A method of enabling a Visited Public Land Mobile Network (VPLMN) to provide a Voice over Long-Term Evolution (VoLTE) and a Short Message Service (SMS) to a User Equipment (UE) roaming within the VPLMN and subscribed to a Home Public Land Mobile Network (HPLMN), without requiring an Internet Protocol Multimedia Subsystem (IMS) registration between the VPLMN and the HPLMN, the method comprising:
 providing an Interworking Function (IWF) in communication with the VPLMN and the HPLMN, wherein the IWF comprises an IMS Core, a virtual Mobile Switching Center/Visitor Location Register (vMSC/VLR), a Diameter Routing Agent (DRA), and a Packet Data Network Gateway (PGW);
 intercepting, by the DRA of the IWF, an Update Location Answer (ULA) message from the HPLMN to the VPLMN;
 mediating the ULA message to produce a mediated ULA message and sending the mediated ULA message to the VPLMN, wherein the mediated ULA message enables the VPLMN to obtain an IP address of the PGW of the IWF;
 establishing a General Packet Radio Service Tunneling Protocol (GTP) session between a Serving Gateway (SGW) of the VPLMN and the PGW of the IWF, wherein the PGW is configured to break-out GTP data into the IMS Core of the IWF, thereby enabling the UE to make Mobile Originated (MO) voice calls;
 performing, by the vMSC/VLR of the IWF, a circuit switched (CS) registration with a Home Location Register (HLR) of the HPLMN, wherein the vMSC/VLR sends a MAP Location Update Request message to the HLR and the HLR is configured to store a Global Title of the vMSC/VLR;
 wherein the vMSC/VLR of the IWF bridges a Short Message Service Center (SMSC) of the HPLMN and a Mobility Management Entity (MME) of the VPLMN, enabling the VPLMN to provide the SMS service to the UE, and wherein the vMSC/VLR of the IWF bridges the IMS Core of the IWF and a Gateway MSC (GMSC) of the HPLMN enabling the UE to receive Mobile Terminated (MT) voice calls.

2. The method of claim 1, wherein the DRA mediates the ULA message by inserting an Access Point Name Operator-Identifier Replacement (APN-OI-Replacement) flag requesting the SGW of the VPLMN to replace an Operator-Identifier of the APN with a predefined domain associated with the IWF.

3. The method of claim 1, wherein the DRA mediates the ULA message by inserting a VPLMN Address Allowed (VPAA) flag requesting the SGW of the VPLMN to query a local VPLMN Domain Name Sever (DNS), the local VPLMN DNS being configured to return the IP address of the PGW of the IWF.

4. The method of claim 1, wherein the IWF further comprises a virtual Home Subscriber Server (vHSS) and a Serving Call Session Control Function (S-CSCF) configured to enable an IMS registration.

5. The method of claim 4, wherein responsive to receiving a Session Initiation Protocol (SIP) Register request from the UE, the SGW of the VPLMN is configured to send the SIP Register request to the PGW of the IWF, and wherein the vHSS of the IWF is configured to return a preconfigured profile to the S-CSCF, responsive to which, the S-CSCF is configured to skip a Multimedia-Authentication (MAR/MAA) procedure.

6. The method of claim 1, wherein the IWF enables the VPLMN to provide the SMS service to the UE using a SMS-over-SGs method.

7. The method of claim 1, wherein the IMS Core comprises a Media Control Gateway Function (MGCF) and a Media Gateway (MGW).

8. The method of claim 1, wherein the IMS Core is configured to break-out the MO voice call to a Public Switched Telephone Network (PSTN).

9. The method of claim 1, wherein the VPLMN is configured to map a Tracking-Area request or a Location-Area request from the UE to an address of the vMSC/VLR of the IWF.

10. The method of claim 1, wherein the IWF enables VoLTE roaming toward the VPLMN and CS roaming toward the HPLMN.

11. An Interworking Function (IWF) for enabling a Visited Public Land Mobile Network (VPLMN) to provide a Voice over Long-Term Evolution (VoLTE) and a Short Message Service (SMS) to a user equipment (UE) roaming within the VPLMN and subscribed to a Home Public Land Mobile Network (HPLMN), without requiring an Internet Protocol Multimedia Subsystem (IMS) registration between the VPLMN and the HPLMN, comprising:
 a Diameter Routing Agent (DRA) in communication with the VPLMN and the HPLMN, wherein the DRA is configured to intercept and mediate an Update Location Answer (ULA) message from the HPLMN to the VPLMN to produce a mediated ULA message and to send the mediated ULA message to the VPLMN;
 a Packet Data Network Gateway (PGW) configured to communicate with a Serving Gateway (SGW) of the VPLMN, wherein the mediated ULA message is configured to enable the SGW to receive an IP address of the PGW, thereby enabling a General Packet Radio Service Tunneling Protocol (GTP) session between the SGW of the VPLMN and the PGW of the IWF;

a virtual Mobile Switching Center/Visitor Location Register (vMSC/VLR) configured to perform a circuit switched (CS) registration with a Home Location Register (HLR) of the HPLMN whereby the vMSC/VLR is configured to send a MAP Location Update Request message to the HLR and the HLR is configured to store a Global Title of the vMSC/VLR, wherein vMSC/VLR enables communication between a Short Message Service Center (SMSC) of the HPLMN and a Mobility Management Entity (MME) of the VPLMN, enabling the VPLMN to provide SMS services to the UE; and an IMS Core in communication with the PGW and the vMSC/VLR, the IMS Core configured to break-out Mobile Originated (MO) voice calls to a Public Switched Telephone Network (PSTN) and configured to communicate with a Gateway MSC (GMSC) of the HPLMN via the vMSC/VLR enabling the UE to receive Mobile Terminated (MT) voice calls.

12. The IWF according to claim 11, wherein the DRA mediates the ULA message by inserting an Access Point Name Operator-Identifier Replacement (APN-OI-Replacement) flag requesting the SGW of the VPLMN to replace an Operator-Identifier of the APN with a predefined domain associated with the IWF.

13. The IWF according to claim 11, wherein the DRA mediates the ULA message by inserting a VPLMN Address Allowed (VPAA) flag requesting the SGW of the VPLMN to query a local VPLMN Domain Name Sever (DNS), the local VPLMN Domain Name Sever (DNS) being configured to return the IP address of the PGW of the IWF in response to the query.

14. The IWF according to claim 11, wherein the IWF further comprises a virtual Home Subscriber Server (vHSS) and a Serving Call Session Control Function (S-CSCF) configured to enable an IMS registration.

15. The IWF according to claim 14, wherein responsive to receiving a Session Initiation Protocol (SIP) Register request from the UE, the SGW of the VPLMN is configured to send the SIP Register request to the PGW of the IWF, and wherein the vHSS of the IWF is configured to return a preconfigured profile to the S-CSCF, responsive to which, the S-CSCF is configured to skip a Multimedia-Authentication (MAR/MAA) procedure.

16. The IWF according to claim 11, wherein the IWF enables the VPLMN to provide the SMS service to the UE using a SMS-over-SGs method.

17. The IWF according to claim 11, wherein the IMS Core comprises a Media Control Gateway Function (MGCF) and a Media Gateway (MGW).

18. The IWF according to claim 11, wherein the VPLMN is configured to map a Tracking-Area request or a Location-Area request from the UE to an address of the vMSC/VLR of the IWF.

19. The IWF according to claim 11, wherein the IWF enables VoLTE roaming toward the VPLMN and CS roaming toward the HPLMN.

* * * * *